No. 732,682. Patented June 30, 1903.

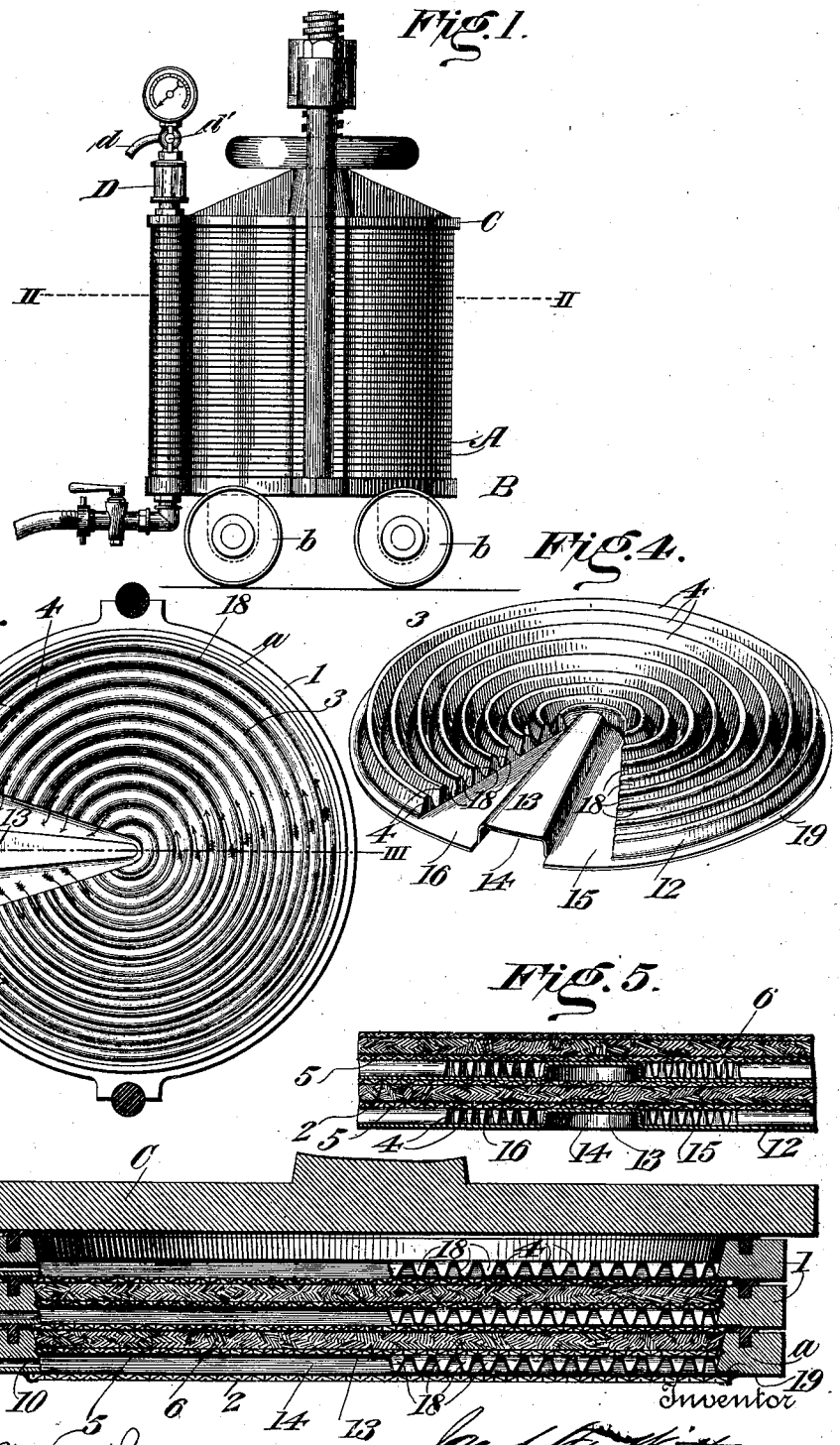

UNITED STATES PATENT OFFICE.

JACOB FREDERIC WITTEMANN, OF BROOKLYN, NEW YORK, ASSIGNOR TO THE WITTEMANN COMPANY, OF NEW YORK, N. Y., A CORPORATION OF NEW YORK.

FILTER.

SPECIFICATION forming part of Letters Patent No. 732,682, dated June 30, 1903.

Application filed February 28, 1900. Serial No. 6,869. (No model.)

*To all whom it may concern:*

Be it known that I, JACOB FREDERIC WITTEMANN, a citizen of the United States, residing at Brooklyn, in the county of Kings and State of New York, have invented certain new and useful Improvements in Filters; and I do hereby declare the following to be a full, clear, and exact description of the invention, such as will enable others skilled in the art to which it appertains to make and use the same.

My invention relates to improvements in filters or filtering-presses designed particularly for use in filtering beer and the like. In devices of this nature it is the general aim to provide as large a filtering-surface as possible, and this is usually done by multiplying filter elements built into a column. Heretofore each element has generally consisted of several separate parts which must be assembled and also separately handled when it is desired to change the filter, as by substituting a fresh filtering mass and adding new elements.

The objects of the present invention are to produce a filter composed of interchangeable elements all the parts of each of which are combined in one fixed construction and to so construct these elements that when assembled the beer or other fluid to be filtered has ready ingress to and egress from the filter, while the air, water, or other foreign matter in the filter is readily discharged.

To these ends and also to improve generally upon devices of the nature indicated my invention consists in the various features of improvement hereinafter more particularly described and claimed.

In the accompanying drawings, Figure 1 is a side view of a filter constructed in accordance with the present invention. Fig. 2 is a sectional plan view on the line II II of Fig. 1. Fig. 3 is an enlarged section on the line III III of Fig. 2. Fig. 4 is a perspective view of one of the division-plates, and Fig. 5 is a detail section on the line V V of Fig. 2.

Referring now more particularly to the drawings, A indicates the filter elements and, as illustrated, these are arranged in a series or pile upon a bottom plate B, preferably supported upon wheels *b* in the usual manner. A top plate C fits upon the uppermost filter element, and the said top and bottom plates are connected together in any desired and convenient manner to hold the filter elements A in proper position. Preferably suitable packing-rings *a* are interposed between the various filter elements, and between the lower and upper ones of such elements and the bottom and top plates B C, respectively.

Each filter element comprises a ring or frame section 1, having integral therewith or secured thereunto by any suitable means and extending across the bottom of the inclosed circular space a fine screen 2 and a division-plate 3, the latter being placed immediately above the former. Above this division-plate and supported by the corrugations or ribs 4 thereof is a second fine screen 5 also integral with or secured to the ring and extending across the inclosed circular space. This screen 5 is somewhat below the top of the ring, and in the space above said screen is placed the fiber or other filtering material 6. Each ring has an offset or projection formed with three openings 7, 8, and 9, respectively, the respective openings in the various rings communicating with the corresponding openings in one another when the said rings are superposed to produce the pile forming the complete filter, and suitable ports 10 extend through the ring-wall 11 between the said openings and the inclosed circular space between the screens, thus connecting each opening with said space.

The division-plates 3 are of special construction. Each plate has a base or body portion 12, provided with a raised section 13, whose top is at all parts, except the edge adjacent the periphery of the body portion, connected by depending walls with said body portion, this raised section thus producing a radial channel 14 at the lower side of the plate. A section of the base-plate upon each side of this raised section is left blank to produce channels 15 and 16 at the upper side of the plate, and upon the body portion are a series of ribs or corrugations 4, which are substantially the height of the raised section and extend from the outer edge of one of the side channels to the outer edge of the other, said ribs or corrugations being concentrically arranged or of any other suitable or preferred form and arrangement to produce between them channels 18. The outermost rib is set back from the periphery of the body portion, as is also the outermost edge of the raised section 13, whereby there is left a flange 19 to extend under the ring and along its face, and thus permit the attachment of the division-plate to said ring in any suitable manner. The division-plate is so positioned upon its ring that the ports 10 from the openings 7, 8, and 9 open, respectively, into the channels 15, 14, and 16. The combined openings 7 form an inlet-passage for the beer or other fluid. The openings 8 produce an outlet-passage and the openings 9 produce a vent-passage, which last-mentioned passage preferably connects with an observation-glass D, Fig. 1, upon the outlet side of which is a draw-off pipe $d$, controlled by a cock $d'$.

The various filter elements A being arranged in a pile, as previously explained, with the top plate C extending over and closing the openings 7 and 8 in the uppermost ring, the cock $d'$ is turned to open the draw-off pipe, and the beer is admitted into the passage formed by the openings 7. This beer flows through the ports 10 into the channel 15 of each division-plate, thence through the channels 18 into the channels 16, and out into the passage formed by the openings 9, the course being indicated by the arrows in Fig. 2. The beer flowing through the course mentioned drives ahead of it air, water, or other substances contained in the filter, and these pass out of the vent through the draw-off pipe $d$. When only clear beer appears in the observation-glass, the cock $d'$ is closed and the pressure of the inflowing beer forces the beer in the channels 15, 16, and 18 of each division-plate upwardly through the screen 5 and filtering material 6, supported directly above such plate, the beer emerging from the filtering fiber upwardly through the screen 2 and into the channel 14 of the next succeeding division-plate and thence through the ports 10 into the outlet-passage formed by the openings 8.

There is thus produced a filter in which the beer is spread over a large surface and thereby quickly acted upon, said filter being constructed of interchangeable and removable elements each of which has its parts secured together, so that an individual element with its various parts can be handled as a whole without danger of separation or disarrangement of said parts. Furthermore, the screens immediately above the division-plates are supported by their respective plates in such manner as to permit free circulation of the beer below the filtering fiber, each portion of this filtering fiber being, when the various elements are assembled, held between the screens above one division-plate and below the division-plate next succeeding. Finally, the device is simple in construction and the parts are conveniently and compactly arranged.

While I have referred to my improved filter as a "beer-filter," it will of course be understood that the same is equally adapted for the filtration of other substances, as water, beverages generally, extracts, and, in fact, any liquid requiring filtration. It will also be understood that instead of using fiber as the filtering medium I can employ other substances or materials best adapted for the particular substance or liquid being filtered.

Having thus described my invention, what I claim as new, and desire to secure by Letters Patent of the United States, is—

1. As a new article of manufacture, a filtering element comprising in a unitary structure a frame having an inclosed space, and formed with an offset projection having a vent-opening and an inlet and an outlet opening, and a division-plate extending across said space and formed to support screens above and below the same, to provide thereby an intermediate space between the plate and the said screens.

2. A filter element comprising a frame having an inclosed space, a division-plate secured within said frame extending across said space, screens secured to said frame above and below said division-plate, and filtering material supported upon the upper screen.

3. In a filter, a division-plate, a wall extending across a portion thereof, ribs upon said plate producing between them channels which extend from one side of said wall about the plate to the other side of said wall, there being provided at each side of said wall a portion not occupied by the said ribs, whereby channels are produced, a filtering material above said ribs, and inlet, vent, and outlet passages which communicate respectively with the respective channels at the sides of the said wall and the filtering material, substantially as described.

4. In a filter, a division-plate, a wall extending across a portion thereof, ribs upon said plate producing between them channels which extend from one side of said wall about the plate to the other side of said wall, there being provided at each side of the wall a portion not occupied by the said ribs whereby channels are produced, a filtering material above said ribs, a second division-plate above said filtering material and having a raised section to produce a channel in communication with said filtering material, said raised section also forming a wall of the nature of the first-mentioned wall, ribs and channels upon said second division-plate substantially as specified with relation to the first-mentioned division-plate, a filtering material above the ribs of the second-mentioned division-plate, and inlet, vent, and outlet passages communicating respectively with the respective channels at the sides of the said wall and raised section, and the channel formed by the raised section and the last-mentioned filtering material, substantially as described.

5. In a filter, a frame-section having an inclosed space, and a division-plate across said space having concentrically-arranged corrugations, the outer corrugations being located within the space, leaving a peripheral flange on the plate which is secured to one of the sides or faces of said frame-section, substantially as described.

6. In a filter, a frame-section having an inclosed space, a division-plate extending across said space and having a wall extending across a portion of the plate, and ribs upon said plate, producing between them channels which extend from one side of said wall about the plate to the other side of the wall, the said ribs not extending to said wall, whereby channels are left at each side thereof, the said ribs and the outer end of the wall not extending to the periphery of the plate, whereby there is produced upon the plate a flange which extends beyond the periphery of the inclosed space and along the face of the frame-section and is adapted to be secured thereto, substantially as described.

In testimony whereof I affix my signature in presence of two witnesses.

JACOB FREDERIC WITTEMANN.

Witnesses:
V. C. H. SCHWARZ,
L. J. ULRICH.